US009686279B2

(12) United States Patent
Perez

(10) Patent No.: US 9,686,279 B2
(45) Date of Patent: Jun. 20, 2017

(54) METHOD AND SYSTEM FOR PROVIDING GPS LOCATION EMBEDDED IN AN IPV6 ADDRESS USING NEIGHBOR DISCOVERY

(71) Applicant: KONICA MINOLTA LABORATORY U.S.A., INC., San Mateo, CA (US)

(72) Inventor: Maria Perez, Half Moon Bay, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 19 days.

(21) Appl. No.: 14/871,275

(22) Filed: Sep. 30, 2015

(65) Prior Publication Data

US 2017/0093855 A1    Mar. 30, 2017

(51) Int. Cl.
*H04L 29/06* (2006.01)
*H04L 29/12* (2006.01)
(Continued)

(52) U.S. Cl.
CPC ........ *H04L 63/0876* (2013.01); *H04L 5/0053* (2013.01); *H04L 9/3268* (2013.01);
(Continued)

(58) Field of Classification Search
CPC ..... H04L 63/00; H04L 63/08; H04L 63/0823; H04L 63/0876; H04L 63/107; H04L 61/2007; H04L 61/2092; H04L 67/16
See application file for complete search history.

(56) References Cited

U.S. PATENT DOCUMENTS

| 6,236,652 B1 * | 5/2001 | Preston | G01S 5/0027 |
| | | | 370/349 |
| 7,929,535 B2 * | 4/2011 | Chen | H04L 61/2007 |
| | | | 370/349 |

(Continued)

FOREIGN PATENT DOCUMENTS

MY    WO 2010021533 A2 *  2/2010  ....... H04L 29/12207

OTHER PUBLICATIONS

Thomson et al.,"RFC2462: IPv6 Stateless Address Autoconfiguration" [Online], Dec. 1998 [Retrieved on: Mar. 1, 2017], Network Working Group, Retrieved from: < https://tools.ietf.org/pdf/rfc2462.pdf >.*

*Primary Examiner* — Eric W Shepperd
(74) *Attorney, Agent, or Firm* — Buchanan Ingersoll & Rooney PC

(57) ABSTRACT

A method is disclosed of embedding a GPS location of a host device in an IPv6 address using IPv6 Neighbor Discovery, the method includes sending a neighbor solicitation request having a Global Positioning System (GPS) option from a first host device to an IPv6 server via an IPv6 communication network, the GPS option providing GPS information of the first host device; receiving the neighbor solicitation request having the GPS option on the IPv6 server, the IPv6 server configured to capture the neighbor solicitation request and create an IPv6 address with GPS information for the first host device; sending a neighbor discovery advertisement from the IPv6 server to the first host device; receiving the (Continued)

neighbor discovery advertisement and returning a solicit, request and renew message to the IPv6 server; and returning a reply message to the first host device with the IPv6 address with the GPS information.

19 Claims, 2 Drawing Sheets

(51) Int. Cl.
*H04L 29/08* (2006.01)
*H04L 5/00* (2006.01)
*H04L 9/32* (2006.01)

(52) U.S. Cl.
CPC ...... *H04L 61/2007* (2013.01); *H04L 63/0823* (2013.01); *H04L 69/325* (2013.01)

(56) References Cited

U.S. PATENT DOCUMENTS

| | | | |
|---|---|---|---|
| 9,282,187 B1* | 3/2016 | Martino | H04M 3/5116 |
| 2005/0018645 A1* | 1/2005 | Mustonen | H04L 12/24 370/349 |
| 2008/0008179 A1* | 1/2008 | Chen | H04L 61/2007 370/392 |
| 2010/0002700 A1* | 1/2010 | Simpson, Jr. | H04L 29/12783 370/392 |
| 2011/0205965 A1 | 8/2011 | Sprigg et al. | |
| 2011/0247068 A1* | 10/2011 | Tolliver | H04L 41/12 726/22 |
| 2012/0166805 A1 | 6/2012 | Perez | |
| 2015/0016443 A1* | 1/2015 | Erickson | H04L 45/741 370/338 |
| 2015/0304844 A1* | 10/2015 | Liang | H04W 12/06 726/3 |

* cited by examiner

METHOD AND SYSTEM FOR PROVIDING GPS LOCATION EMBEDDED IN AN IPV6 ADDRESS USING NEIGHBOR DISCOVERY

FIELD OF THE INVENTION

The present invention relates to a method and system for providing location tracking embedded in an IPv6 address using IPv6 Neighbor Discovery Options, and more particularly to a software module or software application associated with host device, such as a personal computer or an image forming apparatus, which uses IPv6 Neighbor Discovery options for providing GPS (Global Positioning System) location embedded in the IPv6 address, and upon a change of location of the host, the IPv6 address can be invalidated until the new location has been validated by the system.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (for example, image forming apparatuses and other devices) can configure themselves automatically (i.e., stateless address autoconfiguration) when connected to an IPv6 network using ICMPv6 neighbor discovery messages (i.e., Neighbor Discovery Protocol or NDP).

When first connected to a network, an IPv6 host (or node) sends a link-local multicast neighbor solicitation request advertising its tentative link-local address for double address detection (dad), and if no problem is encountered, the host uses the link-local address. The router solicitations are sent (or router advertisements are received depending on timing) to obtain network-layer configuration parameters, and routers respond to such a request with a router advertisement packet that contains network-layer configuration parameters.

SUMMARY OF THE INVENTION

With the implementation of IPv6 networks, it would be desirable to provide location, for example, GPS location, embedded in an IPv6 address using IPv6 Neighbor Discovery Options to track client devices hosts, and more particularly to a software module or software application associated with a computer device or host device such as an image forming apparatus, which uses IPv6 Neighbor Discovery options for providing GPS location embedded in the IPv6 address, which can provide for security, for example, if the host device is stolen.

A method is disclosed of embedding a GPS location of a host device in an IPv6 address using IPv6 Neighbor Discovery, the method comprising sending a neighbor solicitation request having a Global Positioning System (GPS) option from a first host device to an IPv6 server via an IPv6 communication network, the GPS option providing GPS information of the first host device; receiving the neighbor solicitation request having the GPS option on the IPv6 server, the IPv6 server configured to capture the neighbor solicitation request and create an IPv6 address with GPS information for the first host device; sending a neighbor discovery advertisement from the IPv6 server to the first host device; receiving the neighbor discovery advertisement on the first host device and returning a solicit, request and renew message to the IPv6 server; and receiving the solicit, request and renew message on IPv6 server and returning a reply message with the IPv6 address with the GPS information for the first host device.

A computer program product comprising a non-transitory computer usable medium having a computer readable code embodied therein for a process of embedding a GPS location of a host device in an IPv6 address using IPv6 Neighbor Discovery is disclosed, the process comprising: sending a neighbor solicitation request having a Global Positioning System (GPS) option from a first host device to an IPv6 server via an IPv6 communication network, the GPS option providing GPS information of the first host device; receiving the neighbor solicitation request having the GPS option on the IPv6 server, the IPv6 server configured to capture the neighbor solicitation request and create an IPv6 address with GPS information for the first host device; sending a neighbor discovery advertisement from the IPv6 server to the first host device; receiving the neighbor discovery advertisement on the first host device and returning a solicit, request and renew message to the IPv6 server; and receiving the solicit, request and renew message on IPv6 server and returning a reply message with the IPv6 address with the GPS information for the first host device.

A system is disclosed that embeds a GPS location of a host device in an IPv6 address using IPv6 Neighbor Discovery, the system comprising: a first host device and an IPv6 server, the first host device and the IPv6 server configured to: send a neighbor solicitation request having a Global Positioning System (GPS) option from the first host device to the IPv6 server via an IPv6 communication network, the GPS option providing GPS information of the first host device; receive the neighbor solicitation request having the GPS option on the IPv6 server, the IPv6 server configured to capture the neighbor solicitation request and create an IPv6 address with GPS information for the first host device; send a neighbor discovery advertisement from the IPv6 server to the first host device; receive the neighbor discovery advertisement on the first host device and returning a solicit, request and renew message to the IPv6 server; and receive the solicit, request and renew message on IPv6 server and returning a reply message with the IPv6 address with the GPS information for the first host device.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
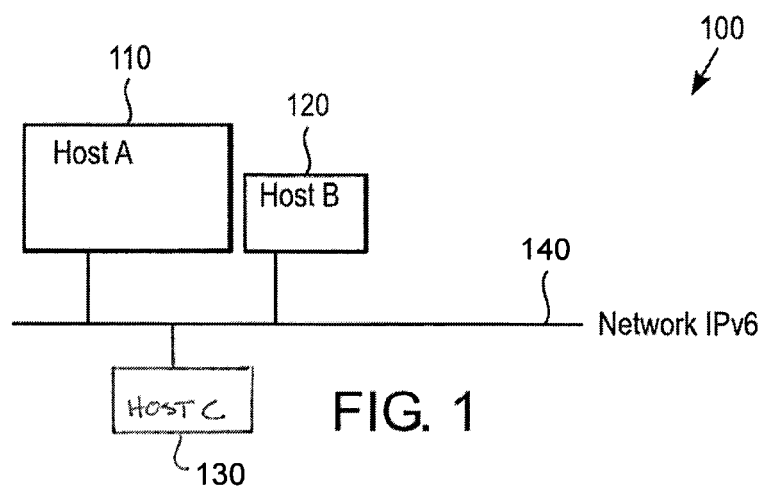
FIG. 1 is an illustration of a network system with a network communication protocol in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a network system 100 having a communication protocol, which includes a first host device (node A) 110 in the form of, for example, a personal computer, a printer, or multi-function peripheral (MFP), a second host device (node B) 120, for example, an IPv6 router or a DHCPv6 server, and a third host device 130, for example, a printer or a multi-function peripheral. In accordance with an exemplary embodiment, the first host device (node A) 110, the second host device (node B) 120, and the third host device 130 (node C) are connected to each other through an IPv6 communication network 140 in a state capable of performing data communications.

In accordance with an exemplary embodiment, the host devices (or nodes A, B, C) 110, 120, 130 can be network devices, which support an IPv6 communication protocol (Internet Protocol version 6). Examples of communication networks 140 consistent with embodiments of the invention include, but are not limited to, the Internet, an Intranet, a local area network (LAN) and a wide area network (WAN). The first host device (or node A) 110, the second host device (node B) 120, and the third host device 130 (node C) can be connected with a wire, or can be connected with a wireless connection by using radio frequency (RF), infrared (IR) transmission, USB, IEEE1394 and/or other suitable wireless technology.

In accordance with an exemplary embodiment, for example, the second host device (node B) 120 may be embodied, for example, by a neighbor, a router, a DHCPv6 server (Dynamic Host Configuration Protocol version 6 server). In accordance with an exemplary embodiment, the third host device (node C) 130 can be a multi-function peripheral (MFP), which includes at least a copy function, an image reading function, and a printer function, and forms an image on a sheet based on a print job (print instruction) received, from the first host device (or node A) 110 from, for example, a client device in the form of a personal computer.

In accordance with another exemplary embodiment, the first host device (or node A) 110, which may be embodied by a computer system, and generates the printing data usable in a printer or multi-function peripheral (MFP) 130 and transmits the generated printing data to the MFP 130. An example of the one or first host device (or node A) 110 may include a computer and/or a portable device such as a notebook personal computer, a cellular phone and a personal digital assistant (PDA). The first host device (or node A) 110 can be a personal computer, and has the function of sending a print job to the third host device (node C) 130.

In accordance with an exemplary embodiment, the first, the second, and the third host devices (or nodes A, B, and C) 110, 120, 130 can constitute an image forming system to install a communication port, to generate printing data, and to perform a printing operation of forming an image on a printing medium according to the printing data. A printer driver program (hereinafter, sometimes simply referred to as a printer driver) can be installed in the first host device 110, and the first host device 110 uses the function of the printer driver to generate a print job including the data of print conditions to be applied at the time of image formation, and image data, and sends the generated print job to the third host device 130.

In the IPv6 protocol, the generation of an IP address (or IPv6 address) for an image forming device or other apparatus/device is defined in RFC 2462, entitled "IPv6 Stateless Address Autoconfiguration." The IPv6 stateless autoconfiguration utilizes several features in IPv6, including link-local addresses, multicasting, the Neighbor Discovery (ND) protocol, and the ability to generate the interface identifier of an address from an underlying data link layer address (or MAC ID). The IPv6 protocol provides a computer device or image forming apparatus the ability to generate a temporary address until it can determine the characteristics of the network, and then create a permanent address it can use based on that information.

In accordance with an exemplary embodiment, the steps a host device or image forming apparatus takes when using stateless autoconfiguration is configured to generate a link-local address, which is one of the two types of local-use IPv6 addresses. The link-local addresses has "1111 1110 10" for the first ten bits. The generated address uses those ten bits followed by 54 zeroes and then the 64-bit interface identifier, for example, which can be derived from the data link layer (MAC) address.

A Link-Local Address Uniqueness Test (or Double address detection (DAD)) can be used to test and to ensure that the address it generated is not for some reason already in use on the local network. The device or apparatus sends a Neighbor Solicitation message using the Neighbor Discovery (ND) protocol, and listens for a Neighbor Advertisement in response that indicates that another device is already using its link-local address, and if so, either a new address must be generated, or autoconfiguration fails and another method must be employed.

Assuming the uniqueness test passes, the host device assigns the link-local address (i.e., Link-Local Address Assignment) to its IP interface. This address can be used for communication on the local network, however, it cannot be used on the wider Internet (or communication network), since link-local addresses are not routed.

The node next attempts to contact a local router for more information on continuing the configuration. This can be done either by listening for Router Advertisement messages sent periodically by routers, or by sending a specific Router Solicitation to ask a router for information on what to do next. The router also provides direction to the node on how to proceed with the autoconfiguration. The router can tell the node that on this network "stateful" autoconfiguration is in use, and tell it the address of a DHCP server to use. Alternately, the router will tell the host how to determine its global Internet address.

Assuming that stateless autoconfiguration is in use on the network, the host will configure itself with its globally-unique Internet address. It can be appreciated that this globally-unique address is generally formed from a network prefix provided to the host by the router, combined with the device's identifier as generated in the first step. In addition, when using the protocol stateless addressing (stateless auto-configuration) for IPv6, which is required by the IPv6 Ready Logo Program, the link-local addresses and global addresses are determined by concatenating an identifier unique to the adapter. Thus, when a MAC address broadcast is sent out, each network interface card on the local area network will see the broadcast address and automatically pass the information up to the upper layers of the OSI model (Open Systems Interconnection model).

Figure 2:
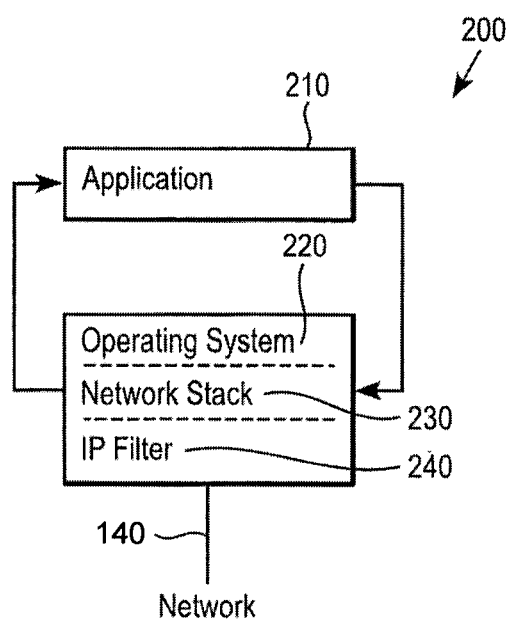
FIG. 2 is an illustration of a network stack having an application for embedding GPS location in an IPv6 address using IPv6 Neighbor Discovery Options in accordance with an exemplary embodiment.

FIG. 2 is an illustration of a network stack for a host device (or node) 200 having an application 210 for filtering data packets in accordance with an exemplary embodiment. As shown in FIG. 2, the host device 200 has a software module (or application) 210 and an IP filter (or packet capture filter) 240, which captures (or intercepts) outgoing and incoming data packets having neighbor solicitation and/or neighbor advertisement requests pursuant to the IPv6 protocol. As shown in FIG. 2, the software module 210 is preferably an application level module, which is configured to modify, drop, change, and judge Neighbor Discovery generated packages (i.e., neighbor solicitation or neighbor advertisement packets) as described herein. In accordance with an exemplary embodiment, the software module 210 can be part of the printer driver and/or firmware of a host device, such as a personal computer, Multi-Function printer, router, and/or a DHCPv6 server, or a separate software module or application, or part to the operating system of the host device.

In accordance with an exemplary embodiment, the IP filter 240 forwards the incoming or outgoing packet having a neighbor solicitation or neighbor advertisement packet (or package) to the software module 210, which in combination with the socket layer modifies, changes, drops and/or judges the neighbor discovery generated packages as described herein. Each of the host devices (or nodes A, B, C) 110, 120, 130 preferably includes a software module (or application) 210, which can perform at least a portion and/or more preferably all of the steps necessary to set and/or decrypt the GPS location and security options as described herein.

The packets (or packages) are preferably broadcast and/or sent out via a communication network, for example, an IPv6 network 140. In accordance with an exemplary embodiment, the IP filter 240 preferably captures the IPv6 packet before the initial broadcast (i.e., neighbor discovery) and/or alternatively, before the packet is sent to the Network Stack 230 for processing. In accordance with an exemplary embodiment, the software module's 210 functionality also can be enabled or disabled at will by a network administrator or other designated individual.

The host device (or node) 200 can include an operating system 220 (OS), which acts as an interface between the device's hardware and application programs, and which is also responsible for the management and coordination of activities and the sharing of the resources within host devices. In accordance with an exemplary embodiment, the software module 210 runs on the operating system 220 of the host device 110, 120, 130 (or nodes A, B, or C), and the network layer is under or a part of the operating system 220. It can be appreciated that by utilizing a software module 210 as described herein, the operating system of the host device 200 does not need to be altered or changed in anyway.

Alternatively, it can be appreciated that in accordance with another exemplary embodiment, the operating system (OS) 220 can be configured to perform the methods as described herein. The examples as set forth herein are exemplary only, and as such, additional security options, which use IPv6 Neighbor Discovery messages, can be implemented without departing from the present disclosure.

Figure 3:
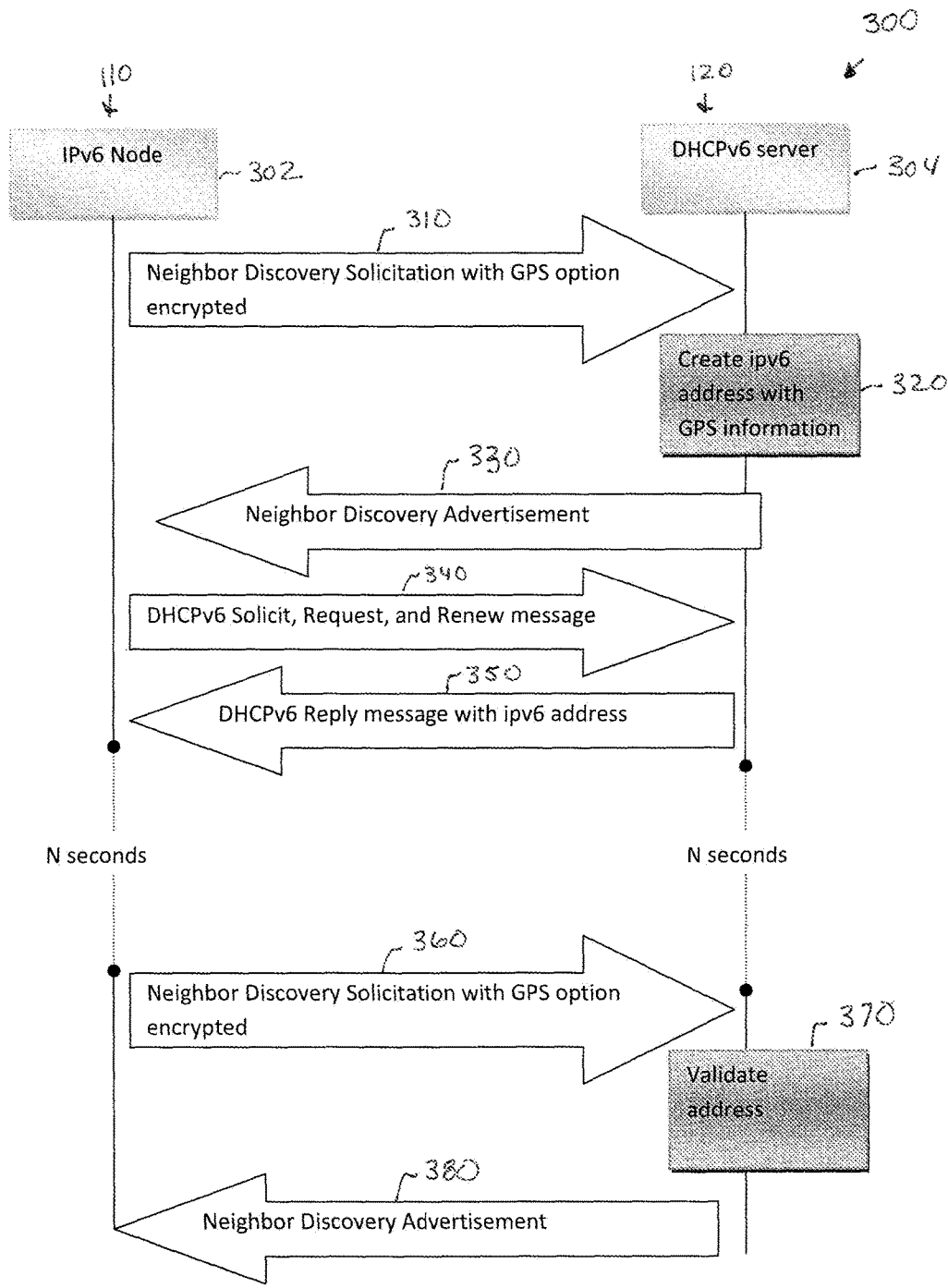
FIG. 3 is a flow chart showing another exemplary embodiment of an implementation of an application, which uses IPv6 Neighbor Discovery Options for embedding a GPS location in an IPv6 address using IPv6 Neighbor Discovery Options.

FIG. 3 is a flow chart 300 showing an exemplary embodiment of an implementation of an application, which uses IPv6 Neighbor Discovery Options for providing GPS location embedded in an IPv6 address using IPv6 Neighbor Discovery Options. In accordance with an exemplary embodiment, in step 310, the first node (or node A) 110 having, for example, a software module 210, sends a neighbor discovery solicitation with an encrypted GPS option, which is broadcast (i.e., Neighbor Discovery request). For example, in accordance with an exemplary embodiment, the first host device 110 can include a program, for example, which enables VPN access to a network system and sends a secure Neighbor Discovery option containing GPS location. The neighbor solicitation request can be sent with, for example, an encrypted GPS location option, which includes a GPS location of the first node 110. As shown in FIG. 3, the Neighbor Discovery Solicitation (310) can be sent from the first node 110, for example, an IPv6 Node 302 to a second node 120, for example, a DHCPv6 server 304.

In accordance with an exemplary embodiment, in step 310, the GPS option can be encrypted, for example, by a pre-shared key or certificate. In accordance with an exemplary embodiment, in connection with stateless addressing, the first host device 110 (or IPv6 node 302) can use at least one security option, for example, a pre-shared key and the IPv6 address containing the GPS location can be encrypted. For example, the second host device 120 can be any node on the network, for example, a neighbor, a router, a DHCPv6 server, or simple node, with a pre-shared key that will be able to decrypt the GPS location encrypted in the address. In accordance with an exemplary embodiment, for example, the at least one security option can include any type of security option including, but not limited to key cryptology, digital certificates, encrypted identifiers, timestamps, and/or other encryption methods.

The neighbor solicitation request with the encrypted GPS option is received on the second node 120 and can be processed by a software module, for example, software module 210 (FIG. 2) associated with the second node 120. In step 320, the second host device 120, for example, the DHCPv6 server 304 creates an IPv6 address with GPS information for the first host device 110. In accordance with an exemplary embodiment, the created IPv6 address can be an encrypted IPv6 address. In step 330, the software module 210 on the second node 120 sends a neighbor advertisement to the first node 110 pursuant to the Neighbor Discovery protocol.

The first node 110 receives the Neighbor Discovery Advertisement ("Advertisement") and generates, for example, a DHCPv6 solicit, request and renew message, which in step 340 is sent to the second node 120. The DHCPv6 solicit, request and renew message can include, for example, a solicit message to locate a DHCPv6 server, a request message to request configuration parameters, including IP addresses or delegated prefixes, from, for example, a specific server, and a renew message to the DHCPv6 server 304 that provided the host device's IPv6 addresses and configuration parameters to extend the lifetimes on the addresses assigned to the host device 110 and to update other configuration parameters, for example, a GPS location. The second node 120 receives the DHCPv6 solicit, request, and renew message, and generates a reply message with an IPv6 address with GPS location of the first host device 110

(DHCPv6 Reply message with IPv6 address), which in step 350 is sent to the first node 110.

In accordance with an exemplary embodiment, after receiving the IPv6 address with GPS location, if the first node 110 wishes to send a job, for example, a print job, to a third host device 130, in step 360, the first host device sends a Neighbor Discovery Solicitation with the encrypted GPS option having the IPv6 address with GPS information to the second node 120. In step 370, the second node 120 validates the IPv6 address including the GPS information and returns in step 380, a neighbor discovery advertisement to the first node 110 in accordance with Neighbor Discovery Advertisement protocol.

In accordance with an exemplary embodiment, for example, by linking the location of the first host device 110 to the IPv6 address, the first host device 110, for example, a personal computer can be tracked. For example, if the location of the first host device 110 changes, and the new location is not within a predetermined or approved location (or area), the system and method as disclosed herein, can be configured to deny the host device 110 access to, for example, network resources. In addition, a new IPv6 address will not be established until the host device 110 validates a new location as described herein and shown in, for example, FIG. 3.

In accordance with an exemplary embodiment, the transmitting of the GPS location can be tied to the IPv6 address of the node, for example, a bridge, hub, switch, or modem, for example, a wireless modem, rather than to a specific host device, for example, such as personal computer.

The following is an exemplary example of a GPS location embedded in an IPv6 address, but the method of embedding this information in the IPv6 address is not confined by this un-encrypted example,
Location
  N37.50193 & W122.46931
  Latitude N 37 degrees 30 minutes 7 seconds
  Longitude W 122 degrees 28 minutes 9.5 seconds
Hex 25 1 E 07 Hex 7A 1C 09, and arbitrary value for directions
  North=A
  South=B
  East=C
  West=D
0000:0000:0000:0000:dddm:mssD:dddm:mssD
where,
  d—degrees
  m—minutes
  s—seconds
  D—direction
0000:0000:0000:0000:0251:E07A:07A1:C09D
Example with 64-bit prefix:
  3333:5678:9123:4567:251 E:070A:7A1C:090D In accordance with an exemplary embodiment, a computer program product comprising a non-transitory computer usable medium having a computer readable code embodied therein for a process of embedding a GPS location of a host device in an IPv6 address using IPv6 Neighbor Discovery is disclosed, the process comprising: sending a neighbor solicitation request having a Global Positioning System (GPS) option from a first host device to an IPv6 server via an IPv6 communication network, the GPS option providing GPS information of the first host device; receiving the neighbor solicitation request having the GPS option on the IPv6 server, the IPv6 server configured to capture the neighbor solicitation request and create an IPv6 address with GPS information for the first host device; sending a neighbor discovery advertisement from the IPv6 server to the first host device; receiving the neighbor discovery advertisement on the first host device and returning a solicit, request and renew message to the IPv6 server; and receiving the solicit, request and renew message on IPv6 server and returning a reply message with the IPv6 address with the GPS information for the first host device.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of embedding a Global Positioning System (GPS) location of a first host device in an Internet Protocol version 6 (IPv6) address using IPv6 Neighbor Discovery, the method comprising:
  sending a neighbor solicitation request having a GPS option from the first host device to an IPv6 server via an IPv6 communication network, the GPS option providing GPS information of the first host device, wherein the GPS option is encrypted with a security option;
  receiving the neighbor solicitation request having the GPS option on the IPv6 server, the IPv6 server configured to capture the neighbor solicitation request, decrypt the GPS option with the security option and create the IPv6 address with GPS information for the first host device;
  sending a neighbor discovery advertisement from the IPv6 server to the first host device;
  receiving the neighbor discovery advertisement on the first host device and returning a solicit, request and renew message to the IPv6 server; and
  receiving the solicit, request and renew message on the IPv6 server and returning a reply message with the IPv6 address with the GPS information for the first host device.

2. The method of claim 1, comprising:
  sending a job with a neighbor solicitation request with the encrypted GPS option from the first host device to the IPv6 server; and
  capturing the neighbor solicitation request and validating the IPv6 address of the first host device on the IPv6 server by confirming that a current GPS location of the first host device matches the GPS information of the first host device in the IPv6 address with GPS information.

3. The method of claim 2, comprising:
  invalidating the IPv6 address when the current GPS location of the first host device does not match the GPS location of the IPv6 address.

4. The method of claim 3, comprising:
generating a new IPv6 address for the first host device after the invalidation of the IPv6 address when the current GPS location of the first host device does not match the GPS location of the IPv6 address, when a second location of the first host device is within an approved location for the first host device.

5. The method of claim 2, wherein the job is a print job, comprising:
sending the print job to a third host device, the third host device configured to receive the print job and print an image on a printing medium based on the print job sent by the first host device.

6. The method of claim 1, comprising:
generating the neighbor solicitation request with the GPS option on a first software module on the first host device;
capturing the neighbor solicitation request with the GPS option request via a second software module on the IPv6 server, wherein the second software module is configured to process the neighbor solicitation request with the security option; and
validating a digital certificate and decrypting a first encrypted job identifier associated with the neighbor solicitation request using the second software module on the IPv6 server.

7. The method of claim 1, comprising:
dropping any neighbor solicitation request in which the IPv6 server is unable to decrypt the security option.

8. The method of claim 1, wherein the GPS information for the first host device is a GPS location of a node, and wherein the first host device is in communication with the node.

9. The method of claim 8, wherein the node is a bridge, a hub, a switch, or a modem.

10. A computer program product comprising a non-transitory computer usable medium having a computer readable code embodied therein for a process of embedding a GPS location of a first host device in an IPv6 address using IPv6 Neighbor Discovery, the process comprising:
sending a neighbor solicitation request having a Global Positioning System (GPS) option from the first host device to an IPv6 server via an IPv6 communication network, the GPS option providing GPS information of the first host device, wherein the GPS option is encrypted with a security option;
receiving the neighbor solicitation request having the GPS option on the IPv6server, the IPv6 server configured to capture the neighbor solicitation request, decrypt the GPS option with the security option and create the IPv6 address with GPS information for the first host device;
sending a neighbor discovery advertisement from the IPv6 server to the first host device;
receiving the neighbor discovery advertisement on the first host device and returning a solicit, request and renew message to the IPv6 server; and
receiving the solicit, request and renew message on the IPv6 server and returning a reply message with the IPv6 address with the GPS information for the first host device.

11. The computer program product of claim 10, comprising:
sending a job with a neighbor solicitation request with the encrypted GPS option from the first host device to the IPv6 server; and
capturing the neighbor solicitation request and validating the IPv6 address of the first host device on the IP6 server by confirming that a current GPS location of the first host device matches the GPS information of the first host device in the IPv6 address with GPS information.

12. The computer program product of claim 11, comprising:
invalidating the IPv6 address when the current GPS location of the first host device does not match the GPS location of the IPv6 address.

13. The computer program product of claim 12, comprising:
generating a new IPv6 address for the first host device after the invalidation of the IPv6 address when the current GPS location of the first host device does not match the GPS location of the IPv6 address, when a second location of the first host device is within an approved location for the first host device.

14. The computer program product of claim 10, comprising:
generating the neighbor solicitation request with the GPS option on a first software module on the first host device.

15. A system that embeds a GPS location of a first host device in an IPv6address using IPv6 Neighbor Discovery, the system comprising:
the first host device, having a processor and memory; and
an IPv6 server, the first host device and the IPv6 server configured to:
send a neighbor solicitation request having a Global Positioning System (GPS) option from the first host device to the IPv6 server via an IPv6 communication network, the GPS option providing GPS information of the first host device, wherein the GPS option is encrypted with a security option;
receive the neighbor solicitation request having the GPS option on the IPv6 server, the IPv6 server configured to capture the neighbor solicitation request, decrypt the GPS option with the security option and create the IPv6 address with GPS information for the first host device;
send a neighbor discovery advertisement from the IPv6server to the first host device;
receive the neighbor discovery advertisement on the first host device and returning a solicit, request and renew message to the IPv6 server; and
receive the solicit, request and renew message on the IPv6 server and returning a reply message with the IPv6 address with the GPS information for the first host device.

16. The system of claim 15, wherein the first host device and the IPv6 server are configured to:
send a job with a neighbor solicitation request with the encrypted GPS option from the first host device to the IPv6 server;
capture the neighbor solicitation request and validating the IPv6 address of the first host device on the IPv6 server by confirming that a current GPS location of the first host device matches the GPS information of the first host device in the IPv6 address with GPS information;
invalidate the IPv6 address when the current GPS location of the first host device does not match the GPS location of the IPv6 address; and
generate a new IPv6 address for the first host device after the invalidation of the IPv6 address when the current GPS location of the first host device does not match the GPS location of the IPv6 address, when a second location of the first host device is within an approved location for the first host device.

17. The system of claim 15, wherein the first host device and the IPv6 server include first and second software modules, which are configured to:
   perform the encrypting of the GPS option with the security option on the first software module;
   perform the decrypting of the security option on the IPv6 server upon receipt of the neighbor solicitation request to create the IPv6 address with GPS information on the second software module.

18. The system of claim 17, wherein the first and second software modules are configured to:
   generate the neighbor solicitation request with the GPS option on the first software module on the first host device;
   capture the neighbor solicitation request with the GPS option request via the second software module on the IPv6 server, wherein the second software module is configured to process the neighbor solicitation request with the security option; and
   validate a digital certificate and decrypt a first encrypted job identifier associated with the neighbor solicitation request using the second software module on the IPv6 server.

19. The system of claim 15, comprising:
   a third host device, which receives a print job from the first host device, and prints an image on a printing medium based on the print job sent by the first host device.

* * * * *